United States Patent
Wild et al.

(10) Patent No.: US 8,115,991 B2
(45) Date of Patent: Feb. 14, 2012

(54) SWITCHABLE INFRARED FILTER

(75) Inventors: Christoph Wild, Denzlingen (DE); Eckhard Wörner, Freiburg (DE); Harald Obloh, Ebringen (DE)

(73) Assignee: Fraunhofer-Gesellschaft zur Forderung der angewandten Forschung e.V., Munich (DE)

(*) Notice: Subject to any disclaimer, the term of this patent is extended or adjusted under 35 U.S.C. 154(b) by 845 days.

(21) Appl. No.: 11/908,669

(22) PCT Filed: Jan. 27, 2006

(86) PCT No.: PCT/EP2006/000724
§ 371 (c)(1), (2), (4) Date: Aug. 22, 2008

(87) PCT Pub. No.: WO2006/097160
PCT Pub. Date: Sep. 21, 2006

(65) Prior Publication Data
US 2008/0304140 A1 Dec. 11, 2008

(30) Foreign Application Priority Data
Mar. 15, 2005 (DE) .................. 10 2005 011 723

(51) Int. Cl.
*F21V 9/04* (2006.01)
(52) U.S. Cl. ...................................... 359/360
(58) Field of Classification Search .................. None
See application file for complete search history.

(56) References Cited

U.S. PATENT DOCUMENTS

| | | | |
|---|---|---|---|
| 3,484,722 A | 12/1969 | Barker, Jr. et al. | 332/4 |
| 4,283,113 A | 8/1981 | Eden | 350/96.15 |
| 4,615,587 A | 10/1986 | Krasutsky et al. | 350/353 |
| 4,795,240 A | 1/1989 | Wong et al. | 350/353 |
| 5,095,384 A | 3/1992 | DeNatale | 359/288 |
| 5,418,640 A | 5/1995 | Hood | 359/265 |
| 5,608,568 A | 3/1997 | Blodgett et al. | 359/288 |
| 5,796,107 A | 8/1998 | Büchtemann et al. | 250/351 |
| 6,489,614 B1 | 12/2002 | Deguchi et al. | 250/338.1 |

FOREIGN PATENT DOCUMENTS

| | | |
|---|---|---|
| DE | 41 32 063 A1 | 8/1993 |
| DE | 195 28 094 A1 | 6/1997 |

OTHER PUBLICATIONS

Tzuk, Yitshak, Tal, Alon, Goldring, Sharon, Glick, Yaakov, Lebiush, Eyal, Kaufman, Guy, Lavi, Raphael, Diamond Cooling of High-Power Diode-Pumped Solid-State Lasers, IEEE Journal of Quantum Electronics, Mar. 2004, vol. 40, No. 3.

Chuprina, V. G., Shurkhal, V. V., An X-Ray Diffraction Study of the Process of Formation of Vanadium Coatings on Diamond, Institute of Problems of Material Science, Academy of Sciences of the Ukrainian SSR, Mar. 1987, pp. 96-99, No. 3(291), Plenum Publishing Corporation.

*Primary Examiner* — Derek S Chapel
(74) *Attorney, Agent, or Firm* — Brinks Hofer Gilson & Lione

(57) ABSTRACT

A switchable infrared filter, consisting of a diamond carrier material (1), whereon a filter material (6), which is made of a thermochromic material, is disposed on one side and which can be connected to a heating device (2, 3).

15 Claims, 3 Drawing Sheets

SWITCHABLE INFRARED FILTER

BACKGROUND

The invention concerns a switchable infrared filter, which without moving parts can be switched from an infrared-transparent state into an infrared-opaque state. Such infrared filters can be advantageously used to modulate a light beam. A further application lies in the field of switchable protective filters, for example, for the protection of sensitive optical sensors from laser radiation.

From U.S. Pat. No. 3,484,722 it is of known art to use a single crystal of vanadium dioxide as a switchable infrared filter. According to the teaching of this document vanadium dioxide is a thermochromic material, which at approx 68° C. demonstrates a semiconductor-metal transition. This phase transition effects a change from an infrared-transparent state to an infrared-opaque state. Particularly disadvantageous here is that the relatively thick crystal can only be heated and cooled slowly such that the switching processes in each case occupy a long period of time. Moreover the infrared filter can only be operated in the reflection mode since the transmission of a light beam is prevented by the heating device fitted at the rear.

A further development of this infrared filter is demonstrated by U.S. Pat. No. 4,795,240. Here the thermochromic vanadium dioxide is applied as a coating onto a silicon wafer. An insulation layer of silicon oxide is located between the thermochromic material and the silicon. Heating of the thermochromic material can take place in a simple manner by means of a direct flow of current through the silicon wafer.

Also disadvantageous in this solution, however, is that on account of the large thermal mass and the low thermal conductivity the filter can be switched only very slowly between the infrared-transparent state and the infrared-opaque state. Furthermore in thermal equilibrium the heated filter has a very non-homogeneous temperature distribution. This leads to spatially non-homogeneous transmission characteristics.

Also with this filter of previous known art operation in transmission mode is only possible to a limited extent. The reason for this lies in particular in that doped silicon material with sufficient electrical conductivity forms impurities, which as a result of incident infrared radiation can also be ionised with photon energies smaller than the band gap energy. As a result even in the infrared-transparent state of the vanadium dioxide there is undesired absorption of the infrared radiation passing through the crystal.

The object of the present invention accordingly consists in providing an infrared filter with faster response characteristics, which has a homogeneous temperature over a sufficiently large surface, and thus has homogeneous transmission characteristics. Furthermore the object consists in specifying a switchable infrared filter, which has an enhanced transmission mode.

SUMMARY

The object is achieved according to the invention by means of a switchable infrared filter, consisting of a carrier material which comprises diamond, on which a filter coating of a thermochromic material is arranged, at least on one side, and which can be connected to a heating device.

According to the invention it has been identified that the disadvantages of the prior art can be solved by the use of diamond as a carrier material of an infrared blocking filter. This is based on the knowledge that the diamond on the one hand possesses a high thermal conductivity, and on the other hand can be manufactured in the form of thin films or coatings with a very low thermal capacity. Thus a low thermal energy is sufficient for the heating of the filter. As a result of the high thermal conductivity heat is distributed homogeneously over the surface of the filter. Furthermore this ensures that after the heat supply has been switched off the temperature falls again very quickly. Thus the switching speed is increased compared with the prior art, as desired.

In contrast to carrier materials according to prior art diamond features a broadband transparency region. This extends from the ultraviolet spectral region (230 nm) through to the far infrared spectral region (20 μm). The only significant absorption band is the two phonons absorption at 3-6 μm wavelength. The maximum absorption coefficient of this band is 12 cm$^{-1}$. With a film thickness of, e.g. 25 μm, the maximum absorption is only approx. 3%. This means that for practical applications the diamond film has an uninterrupted transparency over the whole of the infrared wavelength region. By means of a bloom coating, for example a dielectric coating, it is possible to minimise the reflection losses further. In this manner the transmission of the filter according to the invention is increased compared with prior art. In particular the filter can be used in the region of the atmospheric window between 2 and 5 μm and 8 to 12 μm.

For the manufacture of the carrier material from diamond, preferably suitable, but not essential, is deposition in a manner known per se from an activated gas phase, which contains hydrogen and a carbonaceous compound and is activated by means of coupled-in microwave energy or a heating wire. On a case-by-case basis further chemical elements or compounds can be added to the gas phase in order to influence the diamond material of the carrier in a purposeful manner. It is here familiar to the person skilled in the art that the carrier thus created can contain in addition to diamond also further elements, such as e.g. hydrogen, boron, nitrogen, or metals and metallic compounds, which can be present in the material either finely distributed, or as particles with diameters of a few nanometres up to several microns.

According to the teaching of the invention a coating of a thermochromic material is arranged on at least one surface of the carrier material. This coating represents the actual filter coating, which, depending on its particular temperature, is either infrared-transparent or infrared-opaque. Here by an infrared-transparent state of the filter should be understood a state with increased penetrability for infrared radiation. Correspondingly by an infrared-opaque state of the filter is understood a state with reduced penetrability for infrared radiation. The person skilled in the art will adapt the exact percentage of the radiation transmitted or absorbed to the intended use of the filter in question.

All thin coating methods of known art are suitable for deposition of the thermochromic layer, such as, for example, thermal or electron beam vaporisation, laser ablation, sol-gel methods and sputter methods.

A heating device is provided for the heating of the thermochromic layer, the device being, for example, designed in the form of a heat source that is coupled to the areas of the carrier material not required for the infrared transmission.

An infrared filter according to the present invention that is particularly robust mechanically and has a fast response in particular ensues if the heating device is deposited as an electrical thin coating heating resistance on the diamond carrier material. Here such a heating resistance consists of a metal or an alloy. The heating resistances can run in straight lines, or in a serpentine shape, or in the form of a grid or network. Insofar as the infrared filter according to the invention is to be operated in reflection mode, a planar metallisation can also be considered, which can be used both as an electrical heating resistance and also as a reflecting mirror.

The metallisation can, for example, be achieved by means of a thin coating methods of known art, such as vaporisation or sputtering. Here the coating of sub-areas takes place in a manner known per se by placing the component on a mask, or by means of photolithography.

The heating structures preferably consist of a metal or an alloy that contains titanium and/or platinum. These elements can be deposited with good adhesion in an advantageous manner, and have a beneficial electrical resistance that results in voltages and currents for the operation of the heating device that can easily be managed.

Insofar as the infrared filter is to be operated in transmission mode, the heating structures preferably have a thickness of approx. 1 μm to approx. 50 μm. Here with a separation of approx. 250 μm to approx. 1000 μm the transmission of the filter is only slightly impaired, while on the other hand even heating is ensured as a consequence of the good thermal conductivity of the diamond. The person skilled in the art will adjust the coating thickness in accordance with the desired conductor cross-section.

Particularly advantageously metallisation is executed on a first surface of the planar carrier material, and deposition of the thermochromic material on a second, opposing surface of the carrier material. Thus any short-circuit between the individual structures of the heating device can also be avoided without an intermediate insulating layer.

In a preferred form of embodiment of the infrared filter according to the invention the thermochromic material contains vanadium oxide. By vanadium oxide in the sense of the present invention are understood all compounds with the formula VxOy, thus e.g. $VO_2$, $V_2O_3$, but also non-stoichiometric mixtures. In addition further elements or compounds can be included that influence the properties of the thermochromic material in a purposeful manner, e.g. the adhesive strength, the absorption characteristics, or the temperature of the phase change.

In particular the person skilled in the art will consider vanadium oxide (x=1, y=2). As is already known from prior art, vanadium oxide takes the form of a thermochromic material that at approx. 68° C. demonstrates a semiconductor-metal transition.

In addition to vanadium oxide $V_2O_3$ is also suitable as a thermochromic material. In the case of $V_2O_3$ the semiconductor-metal transition takes place at −123° C. Thus this material is suitable for integration into systems with cooled sensors. Compared with room temperature applications there exists here the advantage that in this temperature region the carrier material of diamond has an even higher thermal conductivity and a significantly lower thermal capacity.

Here coating thicknesses of 0.1 to 1.0 μm are preferred. The coating thickness of the thermochromic coating is selected in such a way that, on the one hand, near-complete absorption is guaranteed, while on the other hand only small masses have to be heated up and cooled. Together with the comparatively low temperature at which the phase change occurs, the switching process can be triggered by the supply or removal of low amounts of thermal energy. This allows the use of the infrared filter with low heating power sources. Thus the filter according to the invention can also be used in a sensitive environment and in applications that require a low energy consumption.

The person skilled in the art will select the thickness of the carrier material in such a way that on the one hand sufficient mechanical stability of the infrared filter is provided, while on the other hand the masses that have to be heated are as small as possible and a sufficient conductor cross-section is available in order to remove the thermal energy again. In particular the person skilled in the art will here consider diamond thicknesses between approx. 10 μm and approx. 40 μm.

In order to make possible a rapid switch back into the infrared-transparent state by means of rapid cooling, the infrared filter according to the invention is preferably connected to a heat sink.

A support of a metal, or an alloy, or a ceramic, on which the element is mounted in the edge region, can serve particularly simply as a heat sink. The latter is then either dimensioned to be sufficiently large in order to remove the heat to the environment, or is in turn connected to a cooling body or a housing. In addition the support can, needless to say, also accommodate connecting terminals or an electrical signal guide.

In turn, however, the heat sink can also be manufactured from an infrared-transparent material. In this case the mounting of the carrier material can also take place in a planar manner, i.e. an incident light beam penetrates firstly the thermochromic filter coating, the carrier material, and the heat sink. In this case silicon, germanium, sapphire, KBr, ZnSe or ZnS are, for example, suitable as materials for manufacture of the heat sink.

In one particularly preferred form of embodiment at least one thermal resistance is provided between heat sink and carrier material, which resistance can be connected to a heat sink. Insofar as a particularly rapid and/or particularly even heat removal is desired, a plurality of thermal resistances can also be provided. The person skilled in the art will optimise the number and the dimensions of the thermal resistances on a case-by-case basis, such that according to the desired purpose of application of the infrared filter rapid coolability, low power requirement, or even heating are achieved.

Particularly preferred in one form of embodiment is a thermal resistance formed by a serpentine diamond web. According to the invention it has been identified that serpentine diamond webs in the edge region of the carrier material can be achieved in a particularly simple manner by means of laser cutting. By the guidance of the laser beam cut the cross-section and the length of the thermal edge resistance can be adjusted in a simple manner.

In a further form of embodiment the diamond carrier is connected via an intermediate layer with the heat sink, which has a specific thermal conductivity that is less than that of the carrier material by at least a factor 100. Insofar as an infrared filter is to be operated with an infrared-transparent heat sink in transmission mode, the intermediate layer must also consist of an infrared-transparent material for this purpose. These requirements are, for example, fulfilled by a chalcogenide glass.

Without any limitation of the general concept of the invention the invention is to be described in what follows in more detail with the aid of figures and an example of embodiment.

DESCRIPTION OF AN EXAMPLE EMBODIMENT

Figure 1A:
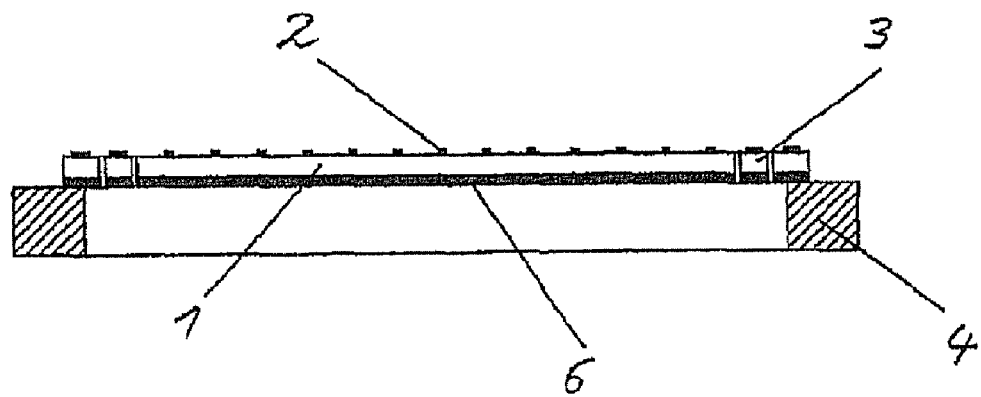
FIG. 1 shows an infrared filter according to the invention in cross-section and in plan view.

By means of low-pressure synthesis a diamond film (1) of approx. 25 μm thickness has been manufactured in a plasma CVD process in a manner known per se. The film has been polished after deposition and cut by means of laser cutting into quadratic pieces of 25×25 mm².

On one side of this diamond film (1) heating resistances (2) have been prepared. For this purpose a paint coating has firstly been applied to the whole surface and lithographically structured. Next a titanium and then a platinum coating have been applied to the surface with a total thickness of 0.1 µm by means of thermal vaporisation. Finally there followed the removal of the metal coating from the locations covered by the paint (lift-off). As a result a structured metallisation is thus obtained, which covers a part of the surface in a stripwise manner. Here the width of an individual metal strip (2) is 10 µm, while the metal strips are arranged with a separation of 0.5 mm. In the region of the diamond film, which is provided for transmission of the infrared radiation, two percent of the surface is thus covered with metal. Correspondingly 98 percent of the surface is free and available for the transmission of incident light. In the edge region of the diamond surface larger metal surfaces (7) are provided, which serve to make contact with the finer metal strips (2).

For the formation of defined thermal edge resistances (3), which enable the removal of the thermal energy to a heat sink (4), a plurality of incisions (5) are applied in the edge region of the diamond film by means of a laser. Thus serpentine diamond structures remain, which as a result of their increased effective length and their reduced cross-section represent a thermal resistance (3).

On the surface of the diamond film opposing the metallisation a 0.4 µm thick coating (6) of vanadium dioxide is applied by sputtering of a $V_2O_3$ target in a $O_2/Ar$ atmosphere.

The diamond film thus prepared is clamped by its outer edge onto a quadratic, metallic frame (4). This frame serves both as a mechanical support for the element and also as a heat sink (4) that cools the component via the thermal edge resistances rapidly and evenly.

Figure 1B:
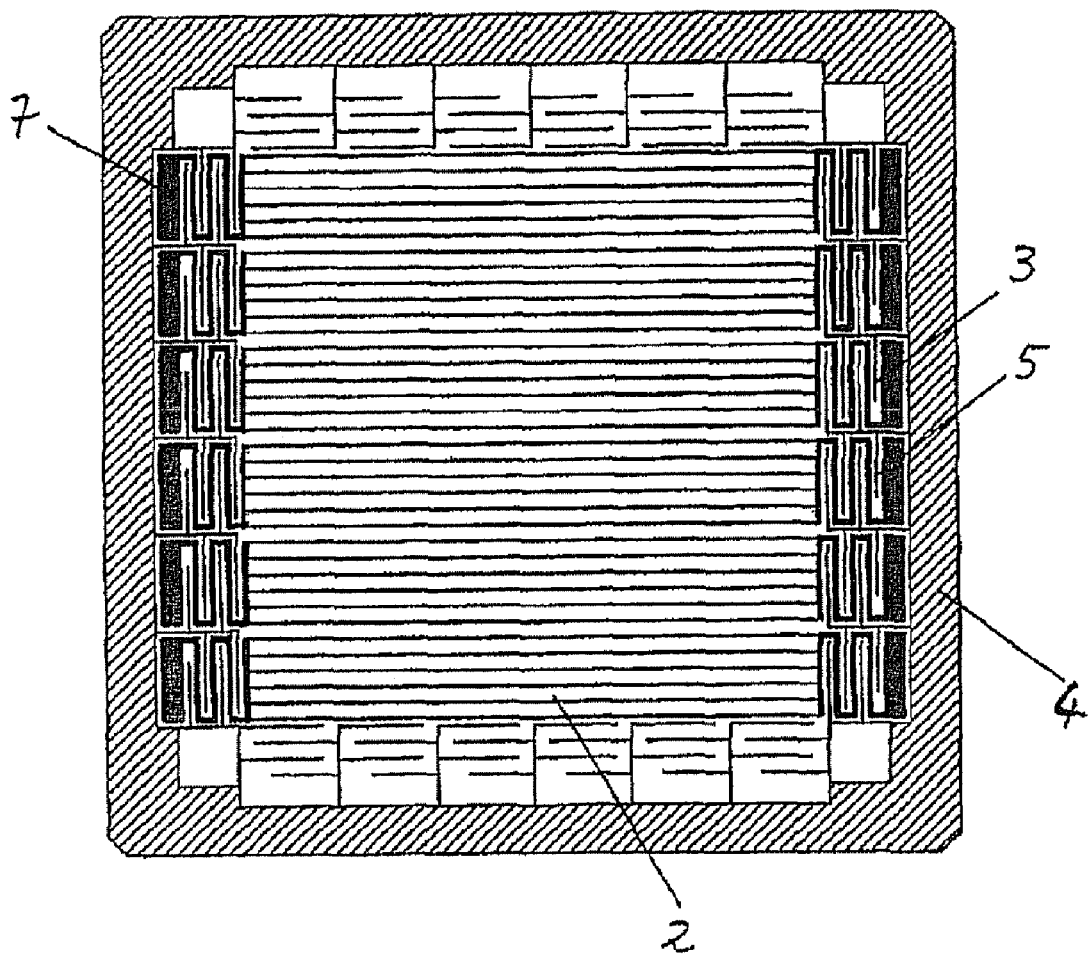
Figure 2:
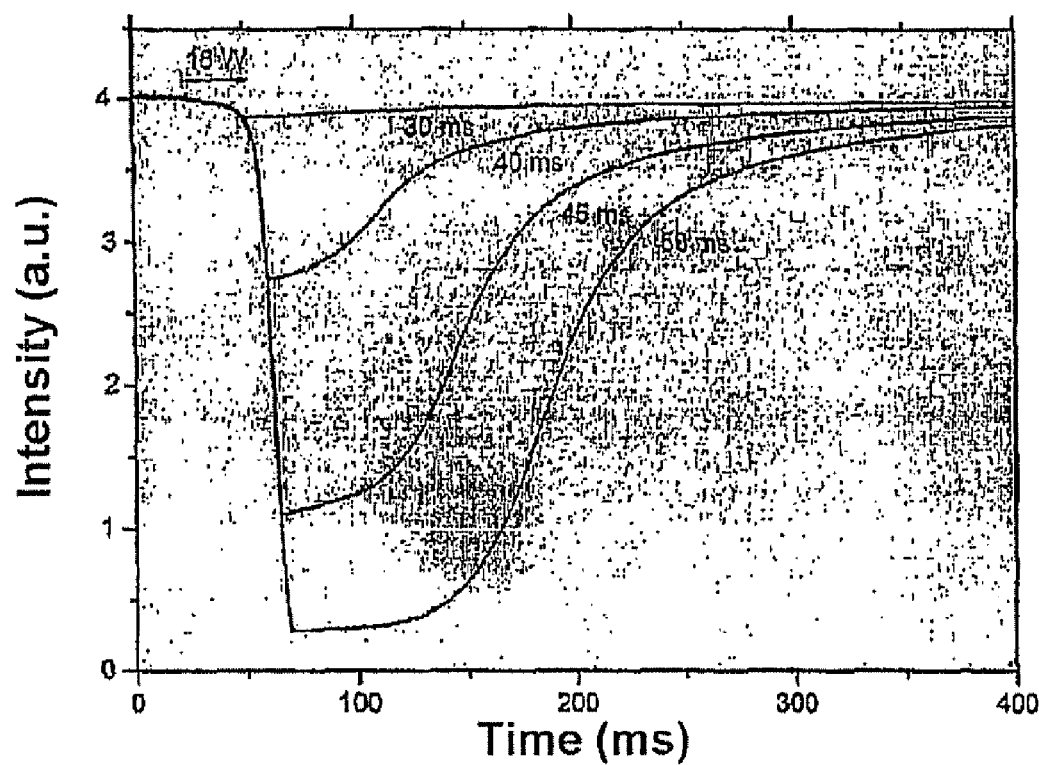
FIGS. 2 and 3 show the intensity of an infrared laser beam transmitted through the element according to FIG. 1 as a function of time.

FIG. 2 shows the intensity transmitted through the element according to FIG. 1 as a function of time. A set of curves from four different tests is represented, in which the electrical resistance heating was switched on for 30, 40, 45 or 50 milliseconds respectively. In each case the heating power was 18 watts, so that the thermal energy applied in each case is 0.54, 0.72, 0.81 and 0.9 joules respectively.

FIG. 2 shows that by the application of 0.9 J thermal energy in 50 ms the transmitted intensity reduces to less than 10% within 30 milliseconds. After the heating is switched off the diamond film cools off again within 100-200 milliseconds and allows the filter coating of vanadium dioxide to undergo another phase transition into the infrared-transparent state.

Figure 3:
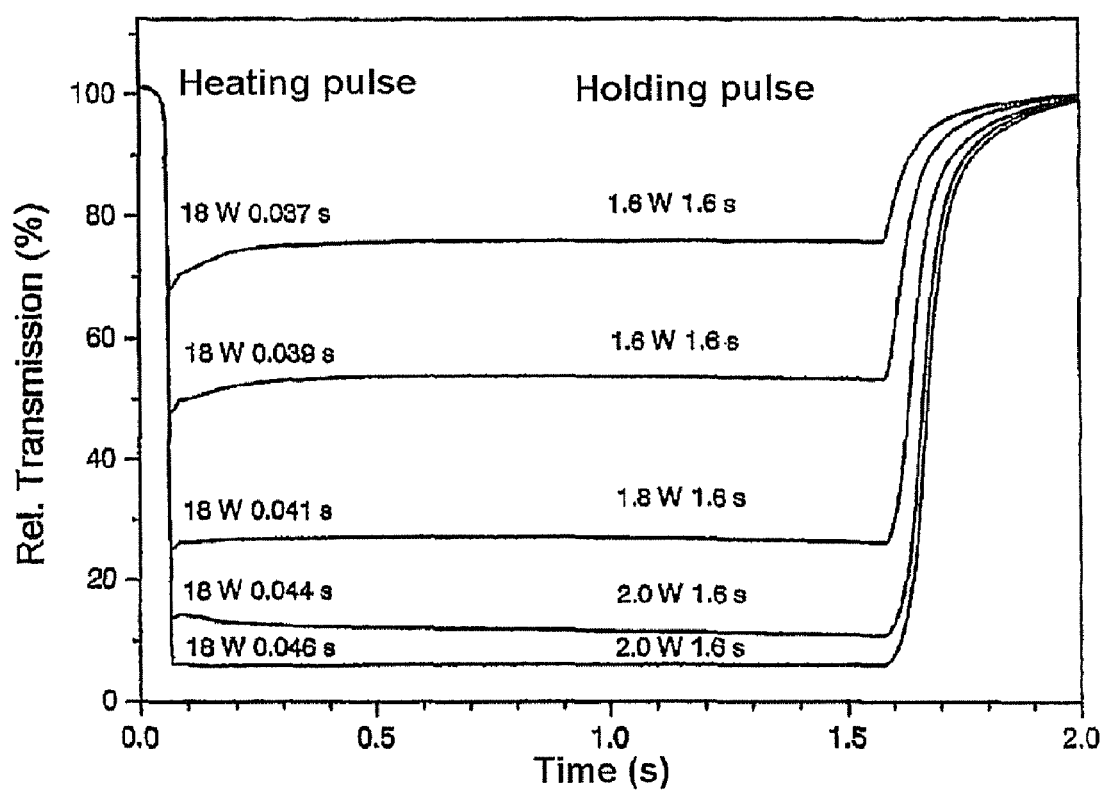

FIG. 3 shows that the infrared-opaque state can be also maintained over longer periods of time. Once again the intensity transmitted through the element according to FIG. 1 is represented as a function of time. A set of curves from five different tests is represented, in which after the heating pulse the temperature was held constant by the application of a 1.6 seconds long holding pulse. Here the electrical power of the holding pulse was at a lower level than that of the heating pulse. The heating powers and heating durations used are specified in detail in FIG. 3. The measurements show that the transmission of the filter investigated can be adjusted to various levels over longer periods of time by means of combination with a heating pulse.

The invention claimed is:

1. A switchable infrared filter, comprising a carrier material comprising diamond, and on which a filter coating of a thermochromic material is arranged, at least on one side, and which is connected to a heating device, and further comprising a heat sink connected to the carrier material and at least one thermal resistance connecting the carrier material to the heat sink wherein the at least one thermal resistance is formed by a serpentine diamond web.

2. The switchable infrared filter according to claim 1, wherein the thermochromic material comprises vanadium oxide.

3. The switchable infrared filter according to claim 2, wherein the thermochromic material comprises $VO_2$ or $V_2O_3$.

4. The switchable infrared filter according to claim 1, wherein the carrier material of diamond is obtained by means of a chemical vapor deposition method.

5. The switchable infrared filter according to claim 1, wherein the carrier material has a thickness of approximately 10 µm to approximately 40 µm.

6. The switchable infrared filter according to claim 1, wherein the thermochromic material has a thickness of approximately 0.3 µm to approximately 0.5 µm.

7. The switchable infrared filter according to claim 1, wherein the heat sink is formed by a support or a housing.

8. The switchable infrared filter according to claim 1, wherein the heat sink is at least partially transparent in the wavelength region from approximately 700 nm to approximately 20 µm.

9. The switchable infrared filter according to claim 1, wherein the heat sink consists of a material which comprises a metal or an alloy, or silicon, or germanium, or sapphire, or KBr, or ZnSe, or ZnS.

10. The switchable infrared filter according to claim 1, wherein the diamond web is obtained by laser cutting.

11. The switchable infrared filter according to claim 1, wherein the thermal resistance is formed by at least one intermediate layer, wherein the specific thermal conductivity of the intermediate layer is less than that of the carrier material by at least a factor of approximately 100.

12. The switchable infrared filter according to claim 11, wherein the intermediate layer contains a chalcogenide glass.

13. A switchable infrared filter, comprising a carrier material comprising diamond, and on which a filter coating of a thermochromic material is arranged at least on one side, and which is connected to a heating device, the heating device consisting of a coating of a metal or an alloy which is arranged at least on subareas of one surface of the carrier material, and further comprising a heat sink connected to the carrier material, and at least one thermal resistance connecting the carrier material to the heat sink, wherein the at least one thermal resistance is formed by a serpentine diamond web.

14. The switchable infrared filter according to claim 13, wherein the heating device contains titanium or platinum.

15. The switchable infrared filter according to claim 13, wherein the structural size of the coating of a metal or an alloy has a width of approximately 1 µm to approximately 150 µm.

* * * * *